Patented July 23, 1935

2,008,753

UNITED STATES PATENT OFFICE 2,008,753

MANUFACTURE OF ALKALI METAL SELENIDES AND TELLURIDES

Frederick B. Downing and Charles J. Pedersen, Carney's Point, N. J., assignors to E. I. du Pont de Nemours & Company, Wilmington, Del., a corporation of Delaware No Drawing. Application December 14, 1932, Serial No. 647,215

20 Claims. (Cl. 23—50)

This invention relates to the manufacture of alkali metal selenides and tellurides.

The alkali metal selenides and tellurides are valuable intermediates employed in the manufacture of certain dyestuffs and also have many other valuable uses. The methods heretofore employed for manufacturing these compounds have proved to be unsatisfactory for the reason that such methods are somewhat complicated, expensive to operate and produce rather low yields of impure compounds.

An object of the present invention is to provide a new and improved method of manufacturing alkali metal selenides and tellurides. Another object is to provide such a method which is simple and inexpensive to operate and which will result in high yields of a relatively pure product in such condition that it may be employed directly in the manufacture of dyes and other useful products. A still further object is to advance the art. Other objects will appear hereinafter.

These objects may be accomplished in accordance with our invention which comprises reacting selenium or tellurium with the alkali metals in the presence of nascent hydrogen. In such process, the selenium and tellurium may be employed in any of their various forms or in the form of the soluble salts of their acids which may be reduced and decomposed by heating in the presence of nascent hydrogen. The alkali metal may be employed as the metal, as the hydroxide, as the alcoholate, or in the form of salts which may be readily decomposed. The nascent hydrogen employed may be generated in any one of a large number of ways.

In order to more clearly illustrate our invention and the preferred mode of carrying the same into effect, the following examples are given:

Example I

Five hundred twenty parts of water are placed in a closed reaction vessel equipped with an agitator and a reflux condenser open to the atmosphere. 170 parts (100% excess) of caustic soda are dissolved in the water. 70 parts of metallic selenium are then added and the charge agitated. Then 22 parts (50% excess) of aluminum filings are added gradually, either continuously or in portions, over an extended period of time, which may range from 15 to 30 minutes for the entire addition. The reaction vessel is then heated to obtain a steady reflux and the heating continued until all of the aluminum is dissolved, which is indicated by the cessation of the evolution of hydrogen. The charge is then cooled, preferably under a gas blanket of nitrogen or other inert gas, whereupon a solution containing approximately 16% sodium selenide results. This solution may then be employed directly in the preparation of selenide dyes or other useful products or the sodium selenide may be isolated by any of the well known methods. The yield of sodium selenide obtained by this method amounts to about 90% of theory.

The metallic selenium employed in the above process may be replaced by any other form of selenium such as the amorphous and vitreous forms. Also soluble selenites, such as sodium selenite, may be employed in place of the metallic selenium in which case the quantities of aluminum and caustic soda should be varied accordingly. Also selenium dioxide and the soluble selenates may be employed with proper variations in the quantities of aluminum and caustic soda. Zinc and other similar metals may be employed in place of the aluminum, if desired. However, the aluminum has proved to be the most satisfactory for our purpose. Further, the caustic soda may be replaced by chemically equivalent amounts of caustic potash with the production of potassium selenide, if desired.

The proportions given above may be widely varied without materially affecting the process provided that an excess of the caustic is present and sufficient of the aluminum is employed to generate enough nascent hydrogen to cause the reaction between the selenium and the alkali metal and the formation of the selenide to go to completion. Furthermore, the sequence of operations may be varied as well as the time allowed for the addition of the aluminum or its equivalent.

Example II

Five hundred and twenty parts of water are placed in the reaction vessel of Example I and 170 parts (100% excess) of caustic soda are dissolved in the water. One hundred and thirteen parts of powdered tellurium are added and the charge agitated. Then 22 parts (50% excess) of aluminum filings are added gradually. The reaction vessel is then heated to obtain a steady reflux and the heating continued until all the aluminum is dissolved. The charge is then cooled, preferably under a gas blanket of nitrogen or other inert gas, whereupon a solution containing approximately 17% sodium telluride results.

As with the selenium of Example I, the tellurium employed in accordance with this example may be in the form of the metal, its oxides or soluble salts of its acids, with proper variations in the amount of caustic and aluminum to retain the approximate molecular proportions of ingredients. Also zinc and other similar metals which will liberate hydrogen from a caustic alkali solution may be substituted for the aluminum. Still further, the caustic soda may be replaced by an equivalent amount of caustic potash, if it is desired to prepare the potassium telluride.

*Example III*

Four hundred fifty parts by weight of commercial ethyl alcohol are placed in the reaction vessel of Example I and 79 parts of selenium added thereto. The charge is then agitated and 73 parts (100% excess) of metallic sodium are added gradually over a period of from about 30 to 60 minutes. During the addition of the sodium and so long as any sodium remains undissolved, care should be taken to prevent water from entering the vessel. When all of the sodium is dissolved the charge is cooled, out of contact with air, if possible, and is ready for use. When the procedure of this example is followed, yields of 80% or more generally result. If desired the solid sodium selenide may be isolated by removing the solvent by evaporation. This should be done, preferably, under diminished pressure.

As in Examples I and II, the selenium may be replaced by tellurium, or any of the salts of their acids which are soluble in the alcohol and which may be decomposed and reduced under the conditions employed. Also other aliphatic alcohols may be substituted for the ethyl alcohol if desired. Furthermore, the sodium may be replaced by an equivalent weight of potassium, when the potassium selenide or telluride is desired. This Example III illustrates some of the variations which may be made in the solvents and reducing agents employed in accordance with our invention.

*Example IV*

In order to prepare 100 parts by weight of solid sodium selenide, 63 parts of selenium, 59 parts (10% excess) of sodium formate and 35 parts (10% excess) of caustic soda are intimately mixed. This mixture is placed in a closed vessel with a vent open to the atmosphere and heated until fusion and reaction have taken place. The resulting product should be cooled under a blanket of nitrogen or other inert gas whereupon the sodium selenide may be removed from the vessel.

The reaction taking place in accordance with this example would appear to be represented by the following simplified equation:

$$NaOH + H.COONa + Se \rightarrow Na_2Se + CO_2 + H_2O$$

As in the prior examples each of the reagents may be replaced by other equivalent substances. For example, the selenium may be replaced by sodium selenite, selenium dioxide, various selenates, tellurium, tellurium oxides and the salts of its acids. The sodium formate may be replaced by potassium formate and the caustic soda may be replaced by caustic potash.

From the above examples it will be readily apparent that many changes and variations may be made in the reagents and their proportions and the conditions under which the reaction is caused to take place without departing from the spirit of our invention. Accordingly, the scope of our invention is to be limited solely by the appended claims, construed as broadly as is permissible in view of the prior art.

We claim:

1. The method of preparing alkali selenides and tellurides which comprises heating a caustic alkali solution containing a member of the group consisting of selenium, tellurium, and their soluble compounds and adding a member of the group consisting of aluminum and zinc.

2. The method of preparing alkali selenides and tellurides which comprises heating a caustic alkali solution containing a member of the group consisting of selenium, tellurium, and their soluble compounds and adding a member of the group consisting of aluminum and zinc gradually over an extended period of time.

3. The method of preparing alkali selenides and tellurides which comprises heating a caustic alkali solution containing a member of the group consisting of selenium, tellurium, and their soluble compounds and adding aluminum.

4. The method of preparing alkali selenides and tellurides which comprises heating a caustic alkali solution containing a member of the group consisting of selenium, tellurium, and their soluble compounds and adding aluminum, the aluminum being added gradually over an extended period of time.

5. The method of preparing alkali selenides which comprises treating a caustic alkali solution containing selenium with aluminum and heat.

6. The method of preparing alkali selenides and tellurides which comprises heating a caustic alkali solution containing a member of the group consisting of selenium and tellurium and adding aluminum, the aluminum being added gradually over an extended period of time.

7. The method of preparing alkali selenides and tellurides which comprises treating a member of the group consisting of selenium, tellurium, and their soluble compounds in an aliphatic alcohol with an alkali metal in metallic form.

8. The method of preparing alkali selenides and tellurides which comprises treating a member of the group consisting of selenium, tellurium, and their soluble compounds in an aliphatic alcohol with an alkali metal in metallic form, adding the alkali metal gradually over an extended period of time.

9. The method of preparing alkali selenides and tellurides which comprises treating a member of the group consisting of selenium, tellurium, and their soluble compounds in a member of the group consisting of methyl and ethyl alcohols with an alkali metal in metallic form.

10. The method of preparing alkali selenides and tellurides which comprises treating a member of the group consisting of selenium, tellurium, and their soluble compounds in a member of the group consisting of methyl and ethyl alcohols with an alkali metal in metallic form adding the alkali metal gradually over an extended period of time.

11. The method of preparing alkali selenides and tellurides which comprises treating a member of the group consisting of selenium, tellurium, and their soluble compounds in ethyl alcohol with an alkali metal in metallic form.

12. The method of preparing alkali selenides and tellurides which comprises treating a member of the group consisting of selenium, tellurium, and their soluble compounds in ethyl alcohol with an alkali metal in metallic form, adding the alkali metal gradually over an extended period of time.

13. The method of preparing alkali selenides which comprises treating selenium in an aliphatic alcohol with an alkali metal in metallic form.

14. The method of preparing alkali selenides which comprises treating selenium in an aliphatic alcohol with an alkali metal in metallic form, adding the alkali metal gradually over an extended period of time.

15. The method of preparing sodium selenide which comprises treating selenium in ethyl alcohol with metallic sodium.

16. The method of preparing alkali selenides and tellurides which comprises mixing a member of the group consisting of selenium, tellurium, and their reducible compounds with caustic alkali and an alkali formate and then heating until fusion and reaction have taken place.

17. The method of preparing alkali selenides which comprises mixing a member of the group consisting of selenium and its reducible compounds with caustic alkali and an alkali formate and then heating until fusion and reaction have taken place.

18. The method of preparing alkali selenides which comprises mixing selenium, caustic alkali and an alkali formate and then heating until fusion and reaction have taken place.

19. The method of preparing alkali selenides and tellurides which comprises reacting, in the presence of nascent hydrogen, a member of the group consisting of selenium, tellurium, selenium dioxide, tellurium oxides, and soluble salts of the acids of selenium and tellurium, with a member of the group consisting of caustic alkalies and alkali alcoholates.

20. The method of preparing alkali selenides which comprises reacting, in the presence of nascent hydrogen, a member of the group consisting of selenium, selenium dioxide and soluble salts of the acids of selenium, with a member of the group consisting of caustic alkalies and alkali alcoholates.

FREDERICK BAXTER DOWNING.
CHARLES J. PEDERSEN.